United States Patent
Milacic

(10) Patent No.: US 6,881,507 B2
(45) Date of Patent: Apr. 19, 2005

(54) METHOD AND APPARATUS FOR MEASURING THE MASS FLOW OF HYDROGEN IN A FUEL CELL

(76) Inventor: Milos Milacic, 36700 Elizabeth La., New Boston, MI (US) 48164

( * ) Notice: Subject to any disclaimer, the term of this patent is extended or adjusted under 35 U.S.C. 154(b) by 43 days.

(21) Appl. No.: 10/453,356

(22) Filed: Jun. 4, 2003

(65) Prior Publication Data
US 2004/0247952 A1 Dec. 9, 2004

(51) Int. Cl.$^7$ ............... H01M 8/02; G01F 1/075; G01F 15/06
(52) U.S. Cl. ............... 429/12; 429/13; 429/22; 429/34; 73/861.75; 73/861.77; 73/861.78; 73/861.79; 73/861.88; 73/861.93
(58) Field of Search ............... 429/12, 13, 22, 429/34; 73/861.75, 861.77, 861.78, 861.79, 861.88, 861.93

(56) References Cited

U.S. PATENT DOCUMENTS

| 5,366,821 A | 11/1994 | Merritt et al. |
| 5,771,476 A | 6/1998 | Mufford et al. |
| 5,991,670 A | 11/1999 | Mufford et al. |
| 6,656,619 B1 * | 12/2003 | Belschner et al. ............ 429/25 |
| 2001/0041275 A1 | 11/2001 | Belschner, et al. |
| 2002/0017322 A1 | 2/2002 | Gagnon |
| 2002/0055023 A1 | 5/2002 | Rueeggee, et al. |
| 2002/0102445 A1 | 8/2002 | Senner |

* cited by examiner

Primary Examiner—Hoa Van Le
(74) Attorney, Agent, or Firm—Tung & Associates; Carlos L. Hanze

(57) ABSTRACT

The mass flow of hydrogen fuel in the anode loop of a hydrogen fuel cell is measured using a rotating flow meter. The flow meter includes a bladed rotor mounted for rotation within a tube disposed in the stream of hydrogen fuel flowing through the anode loop. A magnetic sensor senses changing magnetic field caused by the rotation of the rotor and produces an alternating signal having a frequency related to the rotational rate of the rotor, and thus of the mass flow rate of the hydrogen fuel. A fuel purity sensor increases the accuracy of the mass flow measurement by determining the concentration of foreign substances contained in the fuel.

20 Claims, 2 Drawing Sheets

METHOD AND APPARATUS FOR MEASURING THE MASS FLOW OF HYDROGEN IN A FUEL CELL

FIELD OF THE INVENTION

This invention generally relates to electrochemical devices such as fuel cells, and deals more particularly with measuring the mass flow of hydrogen fuel in the anode loop of a fuel cell.

BACKGROUND OF THE INVENTION

Fuel cells are electrochemical energy conversion devices that generate electricity and heat by converting the chemical energy of fuels. A single fuel cell normally consists of an electrolyte sandwiched between two thin electrodes, a porous anode and a cathode. While a variety of differing fuel cells type have been developed, all operate on essentially the same principles. Hydrogen or a hydrogen-rich fuel is fed to the anode where a catalyst separates the hydrogen's negatively charged electrons from positively charged ions (protons). At the cathode, oxygen combines with protons and, in some cases with species such as water, resulting in water or hydroxide ions, respectively. For polymer exchanged membrane (PEM) and phosphoric acid fuel cells, protons move through the electrolyte to the cathode to combine with oxygen and electrons, producing water and heat. In other types of fuel cells such as solid oxide fuel cells (SOFCs), negative ions travel through the electrolyte to the anode where they combine with hydrogen to generate water and electrons. The electrons from the anode side of the cell cannot pass through the membrane to the positively charged cathode; they must travel around it via an electrical circuit to reach the other side of the cell. This movement of electrons is an electrical current which is advantageously used to drive a load, such as an electric motor or other electrical system.

In the case of hydrogen fuel cells, hydrogen fuel is fed to the anode in what is sometimes referred to as the anode loop. The quantity of hydrogen fed to the anode is a function of a variety of factors, including the relative purity of the hydrogen fuel, load demand, and other variable parameters that are unique to each fuel cell system application. Because of the varying parameters in the system, it is important to know the rate of mass flow of the hydrogen through the anode loop. Information concerning the mass flow rate of hydrogen may be used as a feedback signal to one or more controllers which operate and control various parts of the fuel cell system so as to satisfy the desired load demand with maximum efficiency. The need to measure the mass flow of hydrogen is made more difficult due to the presence of foreign substances such as water vapor and nitrogen mixed in the hydrogen which effectively have a dilutive effect.

Accordingly, there is a need in the art for a method and apparatus to accurately measure the mass flow of hydrogen in the anode loop of a fuel cell which is highly reliable and is capable of taking into consideration the dilutive effect of foreign substances in the fuel. The present invention is directed toward satisfying this need.

SUMMARY OF THE INVENTION

A primary object of the invention is to provide a method as well as an apparatus for accurately measuring the mass flow of a fuel, such as hydrogen in a fuel cell. In accordance with the present invention, apparatus for measuring the mass flow of hydrogen in the anode loop of a fuel cell includes a rotor disposed in the flow of the fuel, which is driven to rotate by the fuel flowing therethrough, and a magnetic sensor for sensing the rotation of the rotor and for producing a signal related to the angular rotation of the rotor. The rotor is preferably mounted for rotation within a tube positioned in the flow stream of the fuel. The rotor has blades that may be formed of ferrous magnetic material, or alternatively, of a molded plastic in which one or more magnetic beads are formed. The rotational movement of the blades is sensed by the magnetic sensor. The magnetic sensor produces a series of pulses having a frequency corresponding to the rotational rate of the rotor, and thus of the mass flow of fuel through the tube. Optionally, a purity sensor may be provided for determining the purity of the fuel passing through the tube. The purity sensor senses the presence and magnitude of dilutive foreign substances in the fuel and generates a signal related to the actual purity of the fuel passing through the tube.

Another primary objective of the invention is to provide a method for measuring the mass flow of fuel in the anode loop of a fuel cell which includes placing a rotatable member in a stream of the fuel flowing through the anode loop so that the member is driven to rotate by the fuel passing thereby, relating the rotational rate of the member to the rate of mass flow of the fuel through the loop, and measuring the rotation rate of the rotatable member. The method also desirably includes the steps of determining the purity of the fuel flowing through the loop and calculating the mass flow of the fuel using both the measured rotational rate and the determined purity of the fuel.

An advantage of the use of a rotatable measuring member within the tube is its simplicity of design and reliability of operation. The tube may be mounted directly in the supply line of the fuel, or within a stack of the fuel cells. The magnetic sensor and associated processing electronics may be mounted on the tube, and sealed as well as electrically shielded so that assembly maybe installed and removed as a single unit. Alternatively, the tube assembly may be mounted in a diverted stream of the fuel to facilitate periodic servicing.

These and other features and advantages of the invention may be better understood by considering the following details of a description of the preferred embodiment of the invention.

In the course of this description, reference will be frequently made to the attached drawings.

DETAILED DESCRIPTION OF THE PREFERRED EMBODIMENT

Figure 1:
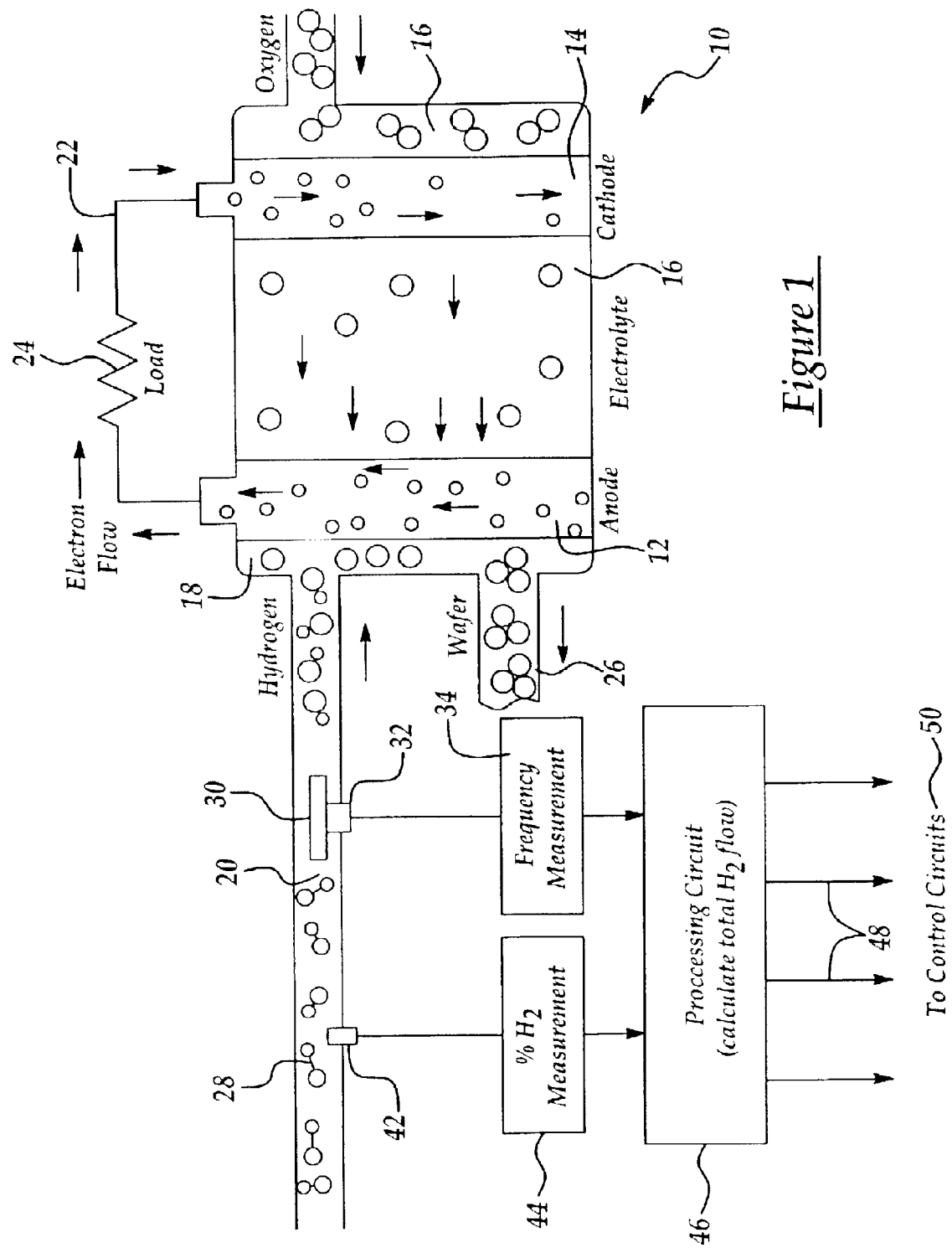
FIG. 1 is a combined block and diagrammatic view of a fuel cell employing apparatus for measuring the mass flow of the fuel in the anode loop thereof, which forms the preferred embodiment of the present invention.

FIG. 1 broadly depicts a solid oxide fuel cell (SOFC), comprising an electrolyte 16 sandwiched between an anode 12 and a cathode 14. An oxidizing agent such as air is delivered from a source into a plenum 16 which directs the air onto the surface of the cathode 14 where oxygen contained in the air is reduced. A gaseous fuel such as hydrogen is introduced from a supply line 20 into a second plenum 18 which directs the hydrogen over the surface of the anode 12. The oxygen is reduced at the cathode 14 is converted into negatively charged oxygen ions which travel through the electrolyte 16 to the anode 12 where they react with the hydrogen fuel gas. The fuel gas is oxidized by the oxygen ions and releases electrons to an external circuit 22 where they produce an electromotive force (voltage) to drive a desired load 24. The oxygen ions also combine with the hydrogen at the surface of the anode to produce water which carried away from the fuel cell via a discharge line 26. The electrons continue flowing through the circuit 22 to the cathode 14 where they reduce oxygen from the air, thus continuing the electricity-generating cycle.

In order to generate a desired level of electricity, a plurality of the fuel cells 10 are stacked together and connected in series to form a fuel cell stack. The individual fuel cells forming the stack may be of several configurations, including monolithic, planar or tubular. Regardless of the exact cell geometry, the fuel cells are stacked so as to create a series of gas flow channels therebetween. In one well known arrangement, the cells are arranged to provide so-called cross flow or orthogonal flow in which the hydrogen fuel gas and the air flow in orthogonal directions to each other in alternating flow channels between the fuel cells.

A control system (not shown) controls the flow of hydrogen fuel to the supply tube 20 in accordance with the demand of the load 24 and various other factors. This control system also exercises process control over a variety of other components normally found in a sophisticated fuel cell system which typically include compressors, air supplies, motors, valves, reformers, etc.

Figure 2:
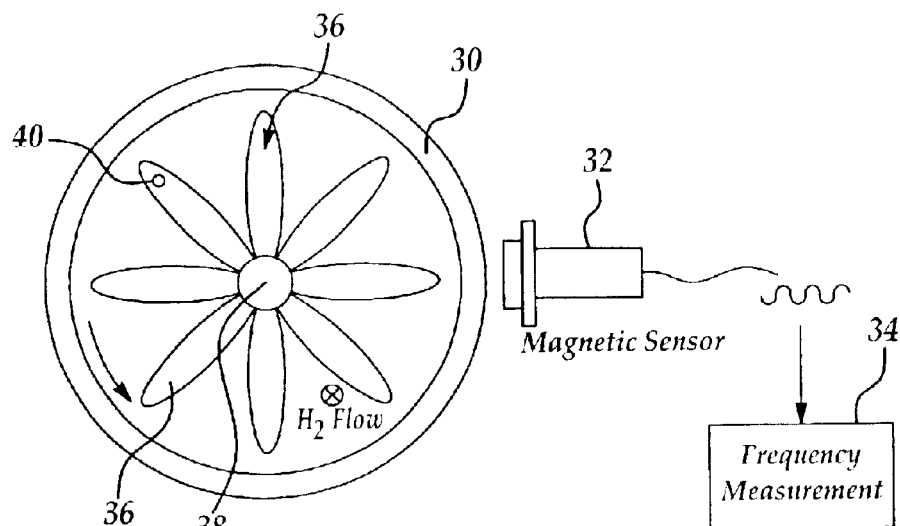
FIG. 2 is a combined block and diagrammatic view of the apparatus for measuring mass flow of the fuel, the tube being depicted in cross-section.

In order to provide an accurate measurement of the mass flow of hydrogen in the anode loop of the fuel cell 10, in accordance with the present invention, a hollow, cylindrically shaped tube 30 is disposed within the supply line 20 so that a stream of the hydrogen freely passes through the tube 30. Referring also now to FIG. 2, the tube 30 is formed of an inert, nonferrous material such as plastic or aluminum. The diameter of the tube 30 will vary with the application but may be, for example, one quarter inch, in a typical application of an on-board fuel cell supplying auxiliary power to an automobile. A rotor 38 having a plurality of circumferentially spaced, turbine-like blades 36 is mounted within the tube 30 for essentially friction free rotation about an axis that is coaxial with the axis of the tube 30. The blades 36 are configured with a fan-shape so as to cause the rotor 38 to rotate as the gaseous hydrogen flows through the tube 30. The blades 36 may be formed of a ferrous magnetic material. Alternatively, the blades 36 may be formed of a non-ferrous material such as plastic, in which case one or more magnetic elements such as a ferrous bead 40 is secured to or molded into the blade 36.

A conventional magnetic sensor 32 is mounted outside of the tube 30, but in close proximity to the rotating blades 36 so as to sense the passing of either the ferrous magnetic blades 36, or the beads 40 as the rotor 38 is driven to rotate by the stream of hydrogen flowing through the tube 30. The magnetic sensor 32 produces an alternating or sinusoidal signal having a frequency that is related to the angular rotational rate of the rotor 38. This frequency, which is directly related to the mass flow rate of the hydrogen in the anode loop, is measured by a suitable frequency measuring circuit which is well known in the art, and therefore need not be disclosed here.

Figure 3:
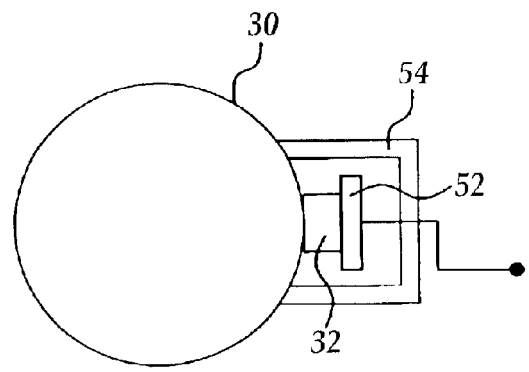
FIG. 3 is a view similar to FIG. 2 but showing the packaging details of the tube, sensor and related electronics; and, FIG. 4 is a diagrammatic view depicting an alternative form for mounting the mass flow measuring apparatus in a diverted stream of the fuel flow.

Referring to FIG. 3, the sensor 32 as well as a circuit board 52 incorporating the frequency measuring circuit 34 is preferably mounted directly on the tube 30 and is enclosed by an electrically shielded housing 54.

FIG. 1 depicts the tube 30 as being mounted directly within the supply line 20 which feeds the hydrogen fuel to the anode 12. If desired, however the tube 30 and sensor 32 may be mounted within the gas flow passageways described earlier that are formed between adjacent ones of the fuel cells in the stack thereof so as to be exposed to the flow of hydrogen fuel through the stack.

Figure 4:
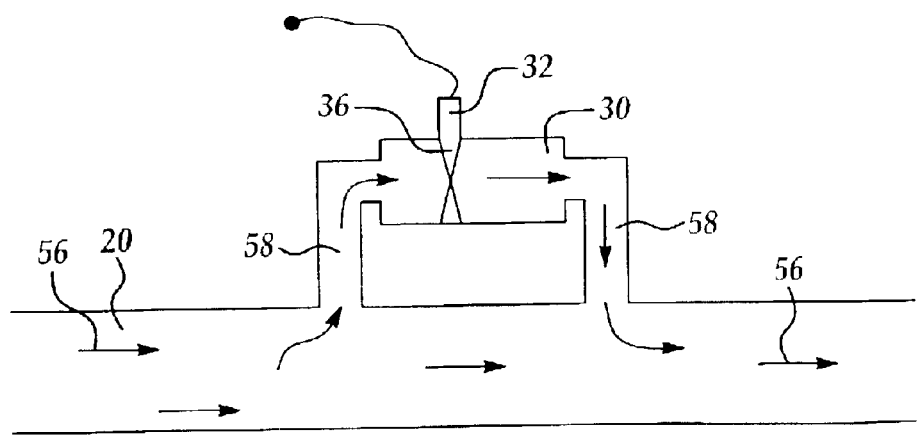

Another arrangement for mounting the fuel mass flow apparatus is depicted in FIG. 4. The tube 30 is mounted in a flow diversion conduit 58 that forms a bypass in the supply line 20. Hydrogen gas flowing in the direction of the arrows 56 enters the conduit 58 and passes through the tube 30, thereby driving the rotor 36 whose angular speed is sensed by the magnetic sensor 32. Hydrogen exiting the tube 30 is returned through the conduit 58 back into the main supply line 20.

As previously noted, the frequency measured by the measurement circuit 34 is indicative of the angular rate of rotation of the rotor 38, and thus of the linear flow rate of hydrogen passing through the supply line 20. This measured frequency is delivered to a processing circuit 46 which may form a part of a master controller such as a fuel cell engine controller or a PLC which controls the entire fuel cell system.

As previously mentioned, hydrogen fuel gas may contain wetting agents and/or impurities such as water vapor or nitrogen which have a dilutive effect in terms of the actual concentration of hydrogen, and the true mass flow of the hydrogen. As an optional feature of the present invention, in order to accurately measure the mass flow of hydrogen fuel gas, the concentration of these dilutive foreign substances must be measured. Accordingly, a purity sensor 42 mounted in the supply line 20 senses the purity of the hydrogen gas in the anode loop. The sensor 42 may employ mass spectrometry techniques to determine the concentrations of hydrogen and each of the dilutive foreign substances contained in the fuel. Concentration measurements taken by sensor 42 are delivered to a means for measuring the percentage of hydrogen present in the supply line. The measuring means 44 may comprise a suitable electronic circuit or software for carrying out the necessary measurement calculations.

The measured concentration of hydrogen is delivered from the measuring means 44 to the processing circuit 46 which combines the hydrogen concentration (purity) information with the frequency measurements indicating the mass flow rate of the hydrogen. The processing circuit 46 calculates the true mass flow of hydrogen through the supply line 20 and uses this information to output various control or feedback signals on lines 48 to other control circuits 50 which operate other parts of the fuel cells system. From the above description, it may be appreciated that a novel method of measuring the mass flow of fuel in the anode loop of a fuel cell is provided, which comprises placing a rotatable member such as a rotor in a stream of the fuel flowing through the loop so that the member is driven to rotate by the fuel flow, relating the rotational rate of the member with the mass flow of the fuel through the loop and measuring the rotational rate of the rotor member. Further, it should be understood that the method includes determining the purity of the fuel that flows through the loop and calculating the mass flow of the fuel using both the measured rotational rate of the rotor and the determined purity.

From the foregoing, it may be appreciated that the method and apparatus for measuring the mass flow of hydrogen in a fuel cell as described above not only provide for the reliable accomplishment of the objects of the invention, but do so in a particularly effective and economic manner. It is recognized, of course, that those skilled in the art may make various modifications or additions to the embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. Apparatus for measuring the mass flow of fuel in the anode loop of a fuel cell:
   a rotor disposed in the flow of said fuel through said loop and driven to rotate by the flow of said fuel past said rotor, said rotor having at least one magnetic element rotating at a speed proportional to rate of flow of said fuel flowing through said loop; and,
   a magnetic sensor for sensing the rotation of said magnetic element and producing a signal related to the rotational speed of said rotor.

2. The apparatus of claim 1, including a tube disposed within the flow of fuel through said anode loop, and wherein said rotor is mounted for rotation within said tube.

3. The apparatus of claim 1, wherein said rotor includes a plurality of circumferentially spaced blades each formed of a ferromagnetic material and passing into proximity with said sensor so as to be detected by said sensor as said rotor rotates.

4. The apparatus of claim 3, wherein said sensor is disposed outside of but in proximity to said tube.

5. The apparatus of claim 1, wherein said rotor includes a plurality of blades driven by the flow of said fuel therethrough, and said magnetic element is mounted on at least one of said blades so as to rotate with said rotor.

6. The apparatus of claim 1, wherein said signal is a sinusoidal signal whose frequency is related to the rate of mass flow of said fuel through said loop.

7. The apparatus of claim 6, including a circuit for measuring the frequency of said sinusoidal signal.

8. The apparatus of claim 1, wherein said fuel is hydrogen.

9. The apparatus of claim 1, including a sensor for sensing the concentration of substances contained in said fuel, and producing a signal containing information indicative of the sensed concentrations.

10. The apparatus of claim 1, including a circuit for determining the flow of pure fuel through said loop using the signals respectively indicative of said rotational rate of said rotor and said sensed concentrations.

11. A method of measuring the mass flow of fuel in the anode loop of a fuel cell, comprising:
   (A) placing a rotatable member in a stream of fuel flowing through said loop so that the member is driven to rotate by fuel passing through the rotor;
   (B) relating the rotational rate of said member with the rate of mass flow of said fuel through said loop; and,
   (C) measuring the rate of rotation of said member.

12. The method of claim 11, including placing a tube in said stream of flowing fuel, and step (A) includes mounting said member for rotation within said tube.

13. The method of claim 11, wherein step (C) is performed by sensing the rotation of said member and producing a signal having a frequency related to the rate of rotation of said member.

14. The method of claim 13, wherein said sensing includes detecting changing magnetic properties of said member during rotation thereof.

15. The method of claim 11, including the steps of:
   (D) determining the purity of the fuel flowing through said loop; and,
   (E) calculating the mass flow of said fuel using the rotational rate measured in step (C) and the purity determined in step (D).

16. A method of determining the mass flow rate of fuel in the anode loop of a fuel cell, wherein the fuel contains dilutive foreign substances, comprising:
   (A) placing a rotatable member in a stream of fuel flowing through said loop so that the member is driven to rotate by the fuel flowing therepast;
   (B) relating the rotational rate of said member with the rate of mass flow of said fuel through said loop;
   (C) measuring the rate of rotation of said member;
   (D) determining the purity of the fuel flowing through said loop;
   (E) calculating the mass flow of pure fuel in said loop using the rotational rate measured in step (C) and the purity of the fuel determined in step (D).

17. The method of claim 16, including placing a tube in said stream of flowing fuel, and step (A) includes mounting said member for rotation within said tube.

18. The method of claim 16, wherein step (C) is performed by sensing the rotation of said member and producing a signal having a frequency related to the rate of rotation of said member.

19. The method of claim 18, wherein said sensing includes detecting changing magnetic properties of said member during rotation thereof.

20. The method of claim 16, wherein step (D) includes sensing the concentration of each of the substances contained in the fuel flowing through said loop.

* * * * *